United States Patent
Yoneda et al.

(10) Patent No.: US 7,834,100 B2
(45) Date of Patent: Nov. 16, 2010

(54) PHENOLIC OH AND RADICALLY POLYMERIZABLE GROUP CONTAINING POLYIMIDE SILICONE AND EPOXY RESIN

(75) Inventors: Yoshinori Yoneda, Annaka (JP); Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 242 days.

(21) Appl. No.: 12/230,762

(22) Filed: Sep. 4, 2008

(65) Prior Publication Data

US 2009/0062479 A1 Mar. 5, 2009

(30) Foreign Application Priority Data

Sep. 5, 2007 (JP) .............................. 2007-230430

(51) Int. Cl.
*C08L 79/08* (2006.01)
(52) U.S. Cl. ....................................... 525/421; 525/423
(58) Field of Classification Search ........................ None
See application file for complete search history.

(56) References Cited

U.S. PATENT DOCUMENTS

| | | | |
|---|---|---|---|
| 4,499,149 A | 2/1985 | Berger | |
| 4,853,452 A | 8/1989 | Lee | |
| 2004/0265731 A1 | 12/2004 | Okada et al. | |
| 2005/0065296 A1* | 3/2005 | Kozakai et al. | ............. 525/530 |
| 2009/0062480 A1* | 3/2009 | Yoneda et al. | ............. 525/417 |

FOREIGN PATENT DOCUMENTS

| | | |
|---|---|---|
| EP | 0 328 027 A2 | 8/1989 |
| JP | 2-036232 A | 2/1990 |
| JP | 10-195278 A | 7/1998 |

* cited by examiner

*Primary Examiner*—Robert Sellers
(74) *Attorney, Agent, or Firm*—Birch, Stewart, Kolasch & Birch, LLP

(57) ABSTRACT

A heat-curable resin composition, comprising
(A) a polyimide silicone resin having a phenolic hydroxyl group and a radically polymerizable group bonded to a silicon atom,
(B) an epoxy resin in such an amount that a molar ratio of the epoxy groups of the epoxy resin to the phenolic hydroxyl groups of the polyimide silicone resin (A) ranges from 0.2 to 10, and
a catalytic amount of (C) an organic peroxide.

9 Claims, No Drawings

PHENOLIC OH AND RADICALLY POLYMERIZABLE GROUP CONTAINING POLYIMIDE SILICONE AND EPOXY RESIN

CROSS REFERENCE

This application claims benefit of Japanese Patent application No. 2007-230430 filed on Sep. 5, 2007, the contents of which are hereby incorporated by reference.

FIELD OF THE INVENTION

The present invention relates to a heat-curable resin composition, specifically to a polyimide silicone resin composition comprising which can be cured by heating at a relatively low temperature for a short period of time to form a film or coating having heat resistance, mechanical strength, flexibility, solvent resistance and adhesion strength to various kinds of substrates.

BACKGROUND OF THE INVENTION

A polyimide resin is excellent in heat resistance and electric insulation, so that it has various applications, for example, printed wiring board, heat resistant adhesive tape, electrical parts, protective layer for semiconductor devices, and interlayer dielectric film. However, the polyimide resin dissolves in a limited number of organic solvents, causing difficulty in handling in some applications. For easy handling, a polyamic acid, which is a polyimide precursor and more soluble in various kinds of organic solvents than a polyimide resin, is applied on a substrate and then heated at a high temperature for a long period of time to be imidized by dehydration and cyclization into a polyimide. This imidization of the polyamic acid to a polyimide requires a long time of heating at a high temperature, which tends to degrade the substrate. Insufficient heating, on the other hand, causes a portion of the polyamic acid to remain, which degrades moisture resistance and corrosion resistance of the polyimide.

In place of the polyamic acid, the invention described in Japanese Patent Application Laid-open No. H02-36232 employs an organic-solvent soluble polyimide resin, and a polyimide resin film is made by applying a solution of the organic-solvent soluble polyimide resin on a substrate and heating it to evaporate the solvent. However, the film obtained from the polyimide resin does not have good solvent resistance.

Japanese Patent Application Laid-open No. H10-195278 describes a heat-curable composition which has improved solvent resistance by comprising a polyimide silicone resin having a phenolic OH group and an epoxy resin. However, the polyimide silicone resin is not sufficiently solubility in a solvent. Further, a cured product thereof does not have desired flexibility and tends to be peeled off from a substrate by heating or humidity. To improve the solubility and the flexibility, one may increase an amount of silicone moieties in a polyimide silicone resin. However, such a resin, in turn, has less phenolic OH group, leading to poorer solvent resistance of a cured product therefrom.

SUMMARY OF THE INVENTION

An object of the present invention is to provide a resin composition which forms a cured film having good solvent resistance and adhesion strength even in a hot and humid environment.

The present invention is a heat-curable resin composition, comprising (A) a polyimide silicone resin having a phenolic hydroxyl group and a radically polymerizable group bonded to a silicon atom, (B) an epoxy resin in such an amount that a molar ratio of the epoxy groups of the epoxy resin to the phenolic hydroxyl groups of the polyimide silicone resin (A) ranges from 0.2 to 10, and a catalytic amount of (C) an organic peroxide.

The present composition is in the form of a solution and miscible with various organic solvents. A cured film can be formed by heating at a relatively low temperature for a relatively short period of time. The cured film obtained has heat resistance, mechanical strength, solvent resistance and adhesion strength to various kinds of substrates and advantageously used for protective films for various kinds of parts and substrates.

DESCRIPTION OF THE PREFERRED EMBODIMENTS

The present composition is cured, in addition to a reaction between the epoxy resin and the phenolic OH groups, by radical polymerization of the radically polymerizable groups bonded to silicon atoms of the polyimide silicone resin (A) in the presence of peroxide catalyst. This allows rapid curing at a low temperature. Examples of the radically polymerizable groups include aliphatic unsaturated groups such as vinyl, propenyl, (meth)acryloyloxypropyl, (meth)acryloyloxyethyl, (meth)acryloyloxymethyl, and aromatic unsaturated group such as a stryl group, among which vinyl group is preferred because of good availability of a raw material. The radically polymerizable group may be bonded to any silicon atom, either terminal one or middle one, of a silicone backbone of the polyimide silicone resin.

Examples of (C) organic peroxides include diacyl peroxides such as diisononanoyl peroxide, dilauroyl peroxide, and dibenzoyl peroxide; alkyl peroxy esters such as t-butylperoxyneodecanoate, t-butyl peroxy vibarate, t-butylperoxy-2-ethylhexanoate, t-butylperoxybenzoate, t-amyl peroxy neodecanoate, t-amyl peroxy acetate; monoperoxy carbonate such as t-butylperoxy isopropyl carbonate, and t-amyl peroxy-2-ethylhexyl; peroxy dicarbonates such as di(e-ethylhexyl)peroxy dicarbonate, 1,6-bis-(4-t-butylperoxy carbonyloxy)hexane, and bis(4-t-butylcyclohexyl)peroxy dicarbonate; peroxyketals such as 1,1-di(t-butylperoxy)-3,3,5-trimethylcyclohexane, n-butyl-4,4-di(t-butylperoxy)butylate, and 1,1-di(t-amyl peroxy) 3,3,5-trimethylcyclohexane; dialkyl peroxides such as dicumylperoxide, di-t-butyl peroxide, and 2,5-dimethyl-2,5-di(t-butylperoxy)hexyene-3; hydro peroxides such as 1,1,3,3,-tetramethylbutyl hydroperoxide, and t-butyl hydroperoxide, among which monoperoxy carbonates and peroxy dicarbonates are preferred because of good miscibility with the polyimide resin (A).

The organic peroxide is incorporated in the composition in a catalytic amount. Preferably, the content of the organic peroxide ranges from 0.1 to 5 parts by weight, more preferably from 0.1 to 3 parts by weight per 100 parts by weight of the polyimide silicone resin (A). If the content exceeds the aforesaid upper limit, storage stability of a composition may be degraded. If the content is below the aforesaid lower limit, solvent resistance of a curing product may not be sufficient.

Examples of the epoxy resin (B) include phenol novolac type epoxy resins, cresol novolac type epoxy resins, bisphenol-A type epoxy resins such as diglycidyl bisphenol-A, bisphenol-F type epoxy resins such as diglycidyl bisphenol- F; triphenylmethane type epoxy resins such as triphenyrolpropane triglycidyl ether; aliphatic cyclic epoxy resins such as 3,4-epoxycyclohexylmethyl-3,4-epoxycyclohexane carboxylate; glycidyl ester resins such as diglycidyl phthalate and diglycidylhexahydrophthalate; and tetraglycidyl aminodiphenylmethane, triglycidyl-p-aminophenol, diglycidylaniline, and diglycidyltoluidine and tetraglycidylbisaminomethyl cyclohexane; and mixtures of these resins. Monofunctional epoxy resins which have one epoxy group per molecule may be used as needed.

The epoxy resin (B) is incorporated in the composition in such an amount that a molar ratio of the epoxy groups of the epoxy resin to the phenolic OH group of the polyimide silicone resin (A) ranges from 0.2 to 10, preferably from 0.5 to 5. With the epoxy resin in an amount less than the aforesaid lower limit, solvent resistance of a cured film may not be good. On the other hand, using the epoxy resin in an amount more than the aforesaid upper limit may degrade heat resistance and flexibility of a cured film. The aforesaid range of the content of the epoxy resin generally corresponds to 0.1 to 50 parts by weight per 100 parts by weight of the polyimide silicone resin (A).

To promote the reaction between the aforesaid epoxy resin and the phenolic OH group, a curing promoter may be used. Examples of the curing promoter include organic phosphine compounds such as triphenylphosphine and tricyclohexylphosphine; amine compounds such as trimethylhexamethylenediamine, diaminodiphenylmethane, 2-(dimethylaminomethyl)phenol, 2,4,6-tris(dimethylaminomethyl)phenol, and triethanolamine; and imidazol compounds such as 2-methylimidazol, 2-ethylimidazol, 2-phenylimidazol, and 2-phenyl-4,5-dihydroxymethylimidazol, among which 2,4,6-tris (dimethylaminomethyl)phenol and 2-methylimidazol are preferred. The curing promoter is incorporated in the composition preferably in an amount of 10 parts by weight or less per total 100 parts by weight of the polyimide silicone resin and the epoxy resin for the reason of good pot life of the composition.

In the polyimide silicone resin (A), the phenolic OH group can reside anywhere in the polyimide silicone resin as far as it reacts with the epoxy resin to form a crosslinkage. Preferably, it resides in a moiety other than Y so as not to sterically hinder the reaction of the radically polymerizable group.

Preferably, the polyimide silicone resin (A) comprises three types of the repeating units represented by the following formulas (1-1), (1-2) and (1-3). The above formula is a compositional formula, that is, p, q and r are numbers representing a molar ratio of the repeating units (1-1), (1-2) and (1-3), respectively, that is, p represents a molar ratio of the unit (1-1), q represents that of the unit (1-2), and r represents that of the unit (1-3), with p+q+r being 1. These repeating units may be bonded in blocks or randomly.

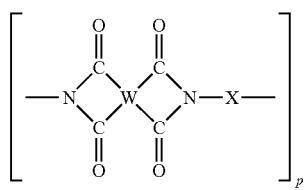
(1-1)

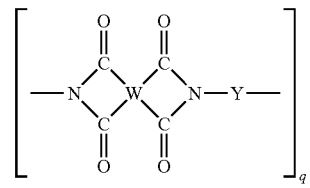
(1-2)

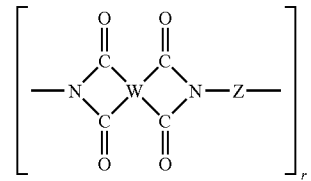
(1-3)

As explained later in the specification, X has a phenolic OH group, and Y has an unsaturated group bonded to a silicon atom. Both groups form crosslinkages of a cured film or coating, providing solvent resistance to the cured film. Further, the silicone moiety in Y provides solubility to the polyimide resin and flexibility to a cured film. Considering these matters, p, q and r preferably meet $0.15 \leq p+q \leq 1.0$ and $0.05 \leq q \leq 0.9$, more preferably $0.2 \leq p+q \leq 1.0$ and $0.05 \leq q \leq 0.8$.

In the above formula, X is a divalent group having a phenolic hydroxyl group and independently selected from the following groups represented by the formulas (2) to (6).

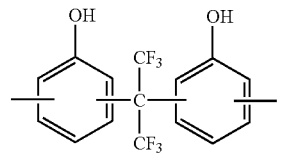
(2)

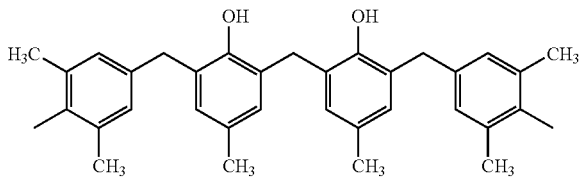
(3)

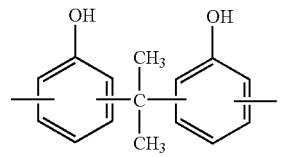
(4)

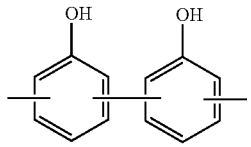
(5)

-continued

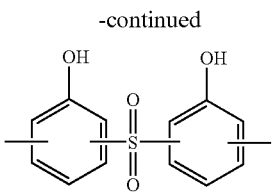
(6)

Y is a divalent silicone residue which has a radically polymerizable group bonded to a silicon atom and is represented by the following formula (7),

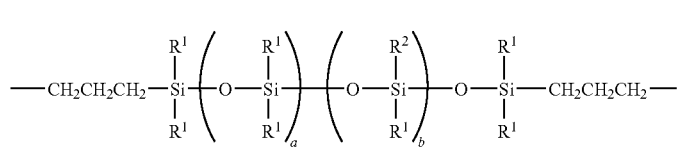
(7)

wherein $R^1$ may be the same with or different from each other and is a substituted or unsubstituted monovalent hydrocarbon group having 1 to 8 carbon atoms. Examples of $R^1$ include methyl, ethyl, propyl, butyl, hexyl and phenyl groups. Among these groups, methyl and phenyl groups are preferred because of good availability of corresponding raw materials. $R^2$ is the radically-polymerizable group, preferably a vinyl group. In the formula (7), a and b integers of from 0 to 100, preferably from 1 to 50. If a or b exceeds 100, a good solubility of a polyimide silicone resin may not be achieved. Preferably, a and b meet $0.1 \leq b/(a+b) \leq 0.6$, more preferably $0.2 \leq b/(a+b) \leq 0.6$. If $b/(a+b)$ is smaller than 0.1, satisfactory solvent resistance of a cured film may not be achieved. If $b/(a+b)$ exceeds 0.6, heat resistance of a cured film tends to be worse.

Z is a divalent group other than X and Y, that is, a divalent group having no phenolic OH or a radically polymerizable group, and can be derived from a conventionally used diamine. Examples of the diamine include aliphatic diamines such as tetramethylenediamine, 1,4-diaminocyclohexane, and 4,4'-diaminodicyclohexylmethane; and aromatic diamines such as phenylenediamine, 4,4'-diaminodiphenyl ether, and 2,2-bis(4-aminophenyl)propane; and a mixture of these amines. Preferably, Z is represented by the following formula (14) wherein B is represented by the formula (15), (16) or (17).

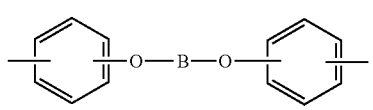
(14)

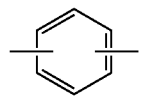
(15)

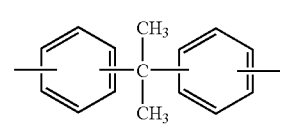
(16)

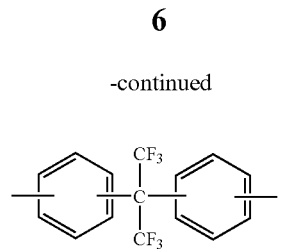
(17)

W is a tetravalent group independently selected from the following organic groups represented by the formulas (8) to (13) shown below.

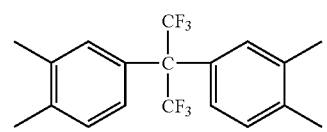
(8)

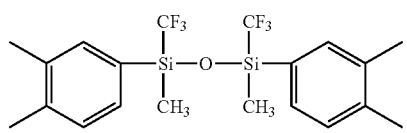
(9)

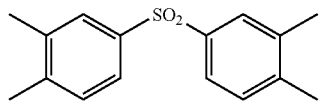
(10)

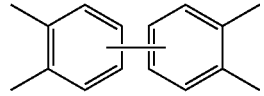
(11)

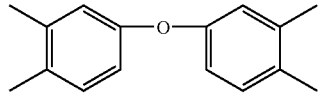
(12)

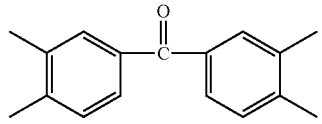
(13)

Preferably, the polyimide silicone resin (A) has a weight average molecular weight, reduced to polystyrene, determined by gel permeation chromatography (GPC) of from 5,000 to 150,000, more preferably from 20,000 to 100,000, most preferably from 20,000 to 50,000. A polyimide silicone resin having a molecular weight smaller than the aforesaid lower limit tends to form a cured product which has poor resistance to heat and solvent. On the other hand, a polyimide silicone resin having a molecular weight larger than the aforesaid upper limit is difficult to dissolve in a solvent.

Preferably, the polyimide silicone resin (A) has a phenolic OH group equivalent weight, i.e., a molecular weight per phenolic OH group, may be abbreviated to OH equivalent, of from 800 g/eq to 5,000 g/eq, more preferably from 800 g/eq to 4,000 g/eq, a vinyl group equivalent weight of from 200 g/eq to 1,000 g/eq, more preferably from 300 g/eq to 800 g/eq, and a theoretical equivalent weight of from 150 g/eq to 800 g/eq, more preferably from 200 g/eq to 650 g/eq, obtained by dividing a molecular weight of the polyimide silicone resin by a total number of the OH groups and the vinyl groups, may be abbreviated to (OH+Vinyl) equivalent. These equivalent weights can be determined based on phenolic OH and vinyl groups contents determined by $^1$H-NMR and a molecular weight determined by GPC. A polyimide silicone resin having these equivalent weights well achieves desired solvent resistance and flexibility of a cured film. Most preferably, the polyimide silicone resin has both of the aforesaid equivalent weights and the aforesaid ranges of p and q.

The polyimide silicone resin can be prepared by a known method. Firstly, an acid anhydride to derive W, a diamine to derive Z, and a diaminopolysiloxane to derive Y are dissolved in a solvent and subjected to a reaction at a low temperature of from 20 to 50° C. to form a polyamic acid. Then, the polyamic acid solution thus obtained is heated to a temperature preferably of from 80 to 200° C., more preferably from 140 to 180° C., to form a solution of a polyimide silicone resin by dehydration cyclization between an acid group and an amide group of the polyamic acid. Subsequently, the solution is poured in a poor solvent such as water, methanol, ethanol or acetonitrile to form a precipitate of the reaction product. By drying the precipitate, the polyimide silicone resin is obtained.

A total molar ratio of the diamine and the diaminopolysiloxane to the tetracarboxylic acid anhydride ranges from 0.95 to 1.05, preferably from 0.98 to 1.02. The solvent used for preparation of the polyimide silicone resin may be N-methyl-2-pyrrolidone, cyclohexanone, γ-butyrolactone, N,N-dimethylacetamide or a mixture of these solvents.

By using an aromatic hydrocarbon such as toluene and xylene together with the aforesaid solvent, water produced in the dehydration reaction can be removed easily by azeotropic distillation.

In order to control a molecular weight of the polyimide silicone resin, it is possible to add a mono-functional acid anhydride such as phthalic anhydride or a mono-functional amine compound such as aniline. In that case, the mono-functional compound may be used preferably in an amount of 2 mole % or less of the polyimide silicone resin.

Alternatively, the imidization can be achieved by using dehydration agent and a imidization catalyst, and then heating the reaction mixture to a temperature of about 50° C. Examples of the dehydration agent include acid anhydrides such as acetic acid anhydride, propionic acid anhydride, and trifluoroacetic acid anhydride. The dehydration agent is used preferably in an amount of from 1 to 10 moles per mole of diamine.

Examples of the imidization catalyst include tertiary amines such as pyridine, collidine, lutidine, and triethylamine. The catalyst is used in an amount preferably of from 0.5 to 10 moles per mole of the dehydration agent.

When two or more of diamine and/or tetracarboxylic acid anhydride are used, the diamines and/or tetracarboxylic acid anhydrides can be premixed and subjected to the reaction all together, or added sequentially and subjected to the reaction sequentially.

To facilitate handling, the present composition can contain a solvent and be used in the form of varnish. Examples of the solvent include ethers such as tetrahydrofuran and anisole; ketone solvents such as cyclohexanone, 2-butanone, methyl isobutyl ketone, 2-heptanone, 2-octanone, and acetophenone; ester solvents such as butyl acetate, methyl benzoate, and γ-butyrolactone; cellosolve solvents such as butyl cellosolve acetate and propylene glycol monomethyl ether acetate; amide solvents such as N,N-dimethylformamide, N,N-dimethylacetamide, N-methyl-2-pyrrolidone; and aromatic hydrocarbon solvents such as toluene and xylene, among which ketone solvents, ester solvents, and cellosolve solvents are preferred and, particularly, cyclohexanone, γ-butyrolactone, and propylene glycol monomethyl ether acetate are preferred. A mixture of two or more of these solvents can be used.

A content of the solvent in the composition is preferably adjusted according to solubility of the resin, workability of application of the composition, and an aimed film thickness. Usually, the content of the solvent is such that a concentration of the polyimide silicone resin ranges from 1 to 40 wt %, but it can be added just before the composition is applied to a substrate.

The composition can comprise conventionally used additives such as thermally conductive fillers, antioxidants, UV-ray absorbers, adhesion promoters, flame retardants, surfactants, storage stabilizers, antiozonants, light stabilizers, thickners, plasticizers, silane coupling agents, thermal stabilizers, conductive fillers, antistatic agents, radiation ray protective agents, nucleating agents, lubricants, pigments, metal deactivators, property adjusting agents in an amount not to adversely affect the present composition. Examples of the additives include inorganic materials such as granular alumina, granular silica, fumed silica, silicon carbide, diamond, clay, boron nitride, aluminum nitride, titanium oxide, dicalcium phosphate, fumed metal oxides; and organic materials such as polyaniline, polythiophene, polypyrrole, polyphenylenevinylene, polydialkylflorene, carbon black and graphite.

The present composition is applied to a substrate and then heated at a temperature of from 150 to 200° C. for 1 to 4 hours to be cured with a solvent, if contained, being removed.

EXAMPLES

The present invention is explained with reference to the following Examples, but not limited thereto.

Synthesis Example 1

Synthesis of a Polyimide Silicone Resin

In a flask provided with a stirrer, a thermometer, and nitrogen purge equipment, 35.8 g (0.1 mole) of 3,3',4,4'-diphenylsulfone tetracarboxylic acid anhydride and 400 g of N-methyl-2-pyrrolidone were placed. In the flask, a solution of 53.3 g (0.06 mole) of diaminosiloxane represented by the formula (18) shown below, 4.3 g (0.02 mole) of 4,4'-(3,3'-dihydroxyl) diaminobiphenyl and 8.2 g (0.02 mole) of 2,2-bis[4-(4-aminophenoxy)phenyl]propane dissolved in 100 g of N-methyl-2-pyrrolidone was added dropwise while keeping a temperature of the reaction mixture at 50° C. or lower.

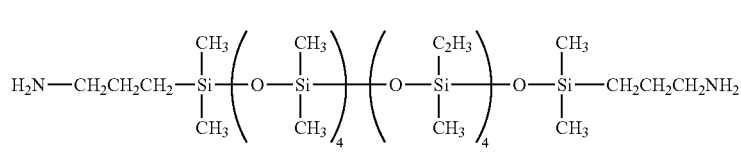

(18)

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (19-1), (19-2) and (19-3), hereinafter referred to as the polyimide silicone resin (a), was obtained.

proplydene bisphthalic acid dianhydride and 400 g of N-methyl-2-pyrrolidone were placed. In the flask, a solution of 44.4 g (0.05 mole) of diaminosiloxane represented by the aforesaid formula (18), 6.5 g (0.03 mole) of 4,4'-(3,3'-dihydroxyl) diaminobiphenyl and 8.2 g (0.02 mole) of 2,2-bis[4-(4-aminophenoxy)phenyl]propane dissolved in 100 g of N-methyl-2-pyrrolidone was added dropwise while keeping a temperature of the reaction mixture at 50° C. or lower.

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

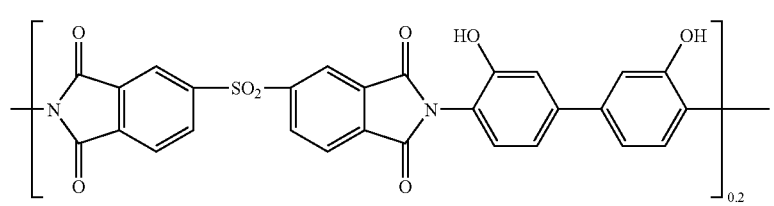

(19-1)

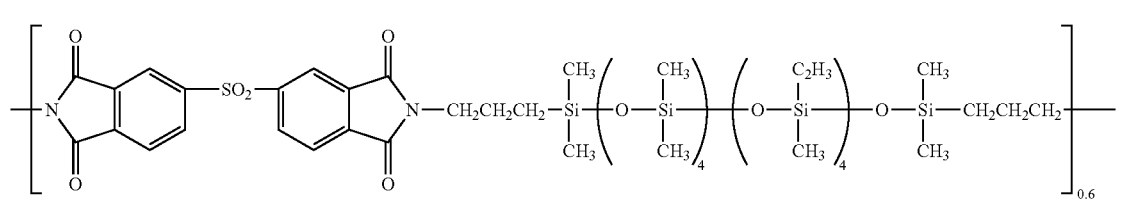

(19-2)

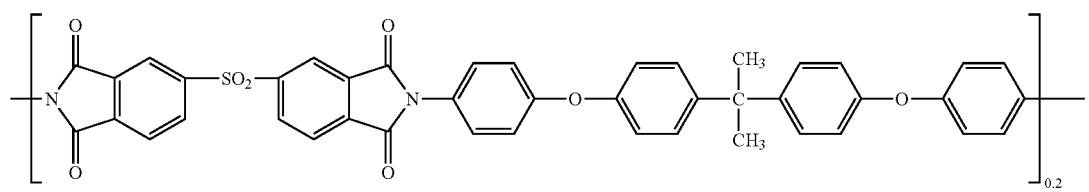

(19-3)

A weight average molecular weight of the resin, reduced to polystyrene, was 37,000, which was determined by gel permeation chromatography (GPC) using tetrahydrofuran as a solvent. Table 1 shows OH, Vinyl, and (OH+Vinyl) equivalent weights of the polyimide silicone resin (a) determined by $^1$H-NMR.

Synthesis Example 2

In a flask provided with a stirrer, a thermometer, and nitrogen purge equipment, 44.4 g (0.1 mole) of 4,4'-hexafluoro- The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (20-1), (20-2) and (20-3), hereinafter referred to as the polyimide silicone resin (b), was obtained.

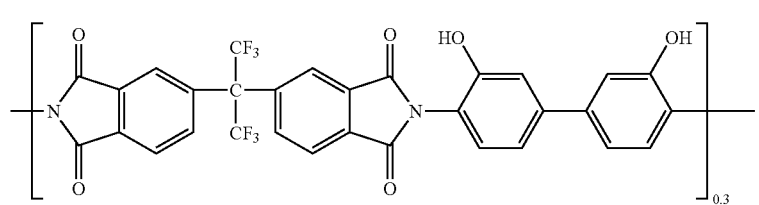

(20-1)

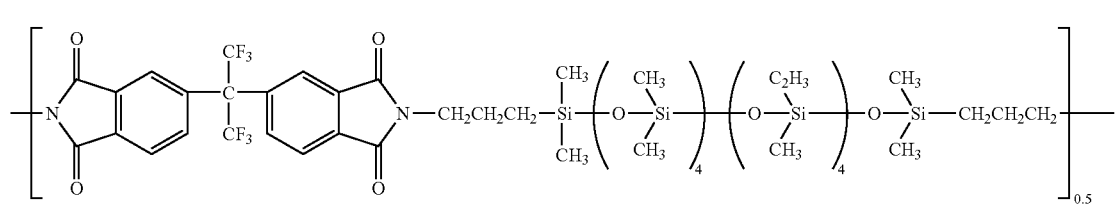

(20-2)

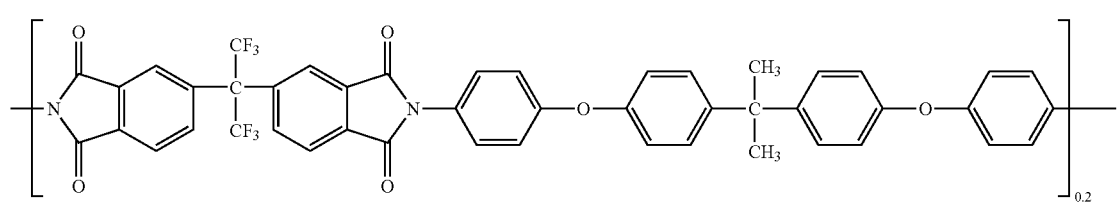

(20-3)

A weight average molecular weight of the resin, reduced to polystyrene, was 34,000, which was determined by gel permeation chromatography (GPC) using tetrahydrofuran as a solvent. Table 1 shows OH, Vinyl, and (OH+Vinyl) equivalent weights of the polyimide silicone resin (b) determined by $^1$H-NMR.

Synthesis Example 3

In a flask provided with a stirrer, a thermometer, and nitrogen purge equipment, 35.8 g (0.1 mole) of 3,3',4,4'-diphenylsulfone tetracarboxylic acid anhydride and 400 g of N-methyl-2-pyrrolidone were placed. In the flask, a solution of 40.9 g (0.01 mole) of diaminosiloxane represented by the following formula (21), 4.3 g (0.02 mole) of 4,4'-(3,3'-dihydroxyl) diaminobiphenyl and 28.7 g (0.07 mole) of 2,2-bis[4-(4-aminophenoxy)phenyl]propane dissolved in 200 g of N-methyl-2-pyrrolidone was added dropwise while keeping a temperature of the reaction mixture at 50° C. or lower.

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (22-1), (22-2) and (22-3), hereinafter referred to as the polyimide silicone resin (c), was obtained.

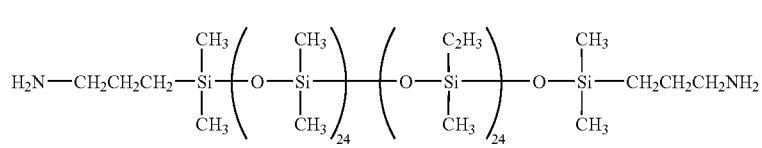

(21)

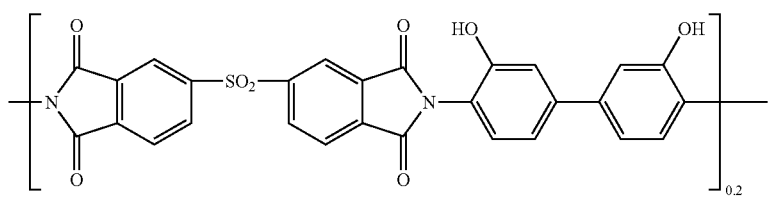
(22-1)

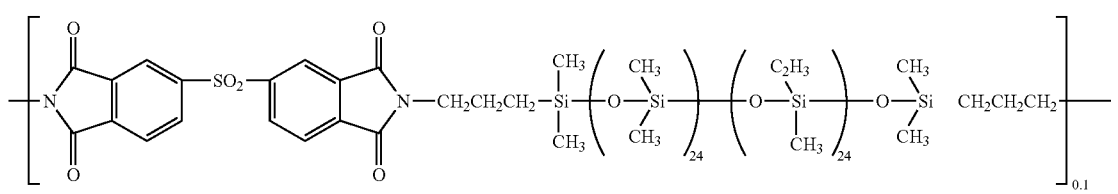
(22-2)

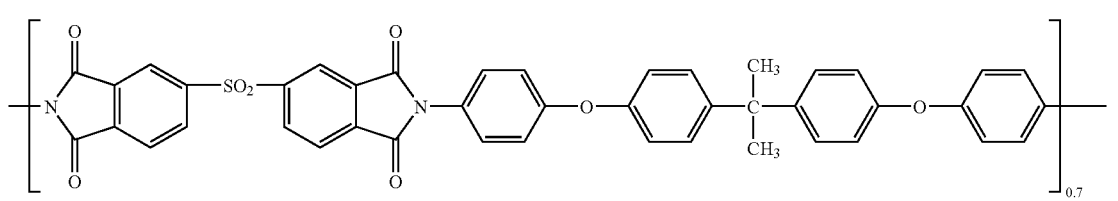
(22-3)

A weight average molecular weight of the resin, reduced to polystyrene, was 39,000, which was determined by gel permeation chromatography (GPC) using tetrahydrofuran as a solvent. Table 1 shows OH, Vinyl, and (OH+Vinyl) equivalent weights of the polyimide silicone resin (c) determined by $^1$H-NMR.

Synthesis 4

Synthesis of a Comparative Polyimide Silicone Resin

In a flask provided with a stirrer, a thermometer, and nitrogen purge equipment, 35.8 g (0.1 mole) of 3,3',4,4'-diphenylsulfone tetracarboxylic acid anhydride and 400 g of N-methyl-2-pyrrolidone were placed. In the flask, a solution of 50.4 g (0.06 mole) of diaminosiloxane represented by the formula (23) shown below which does not have a radically polymerizable group, 4.3 g (0.02 mole) of 4,4'-(3,3'-dihydroxyl)diaminobiphenyl and 8.2 g (0.02 mole) of 2,2-bis[4-(4-aminophenoxy)phenyl]propane dissolved in 100 g of N-methyl-2-pyrrolidone was added dropwise while keeping a temperature of the reaction mixture at 50° C. or lower.

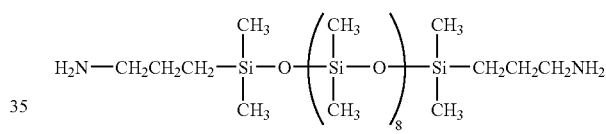
(23)

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (24-1), (24-2) and (24-3), hereinafter referred to as the polyimide silicone resin (c), was obtained.

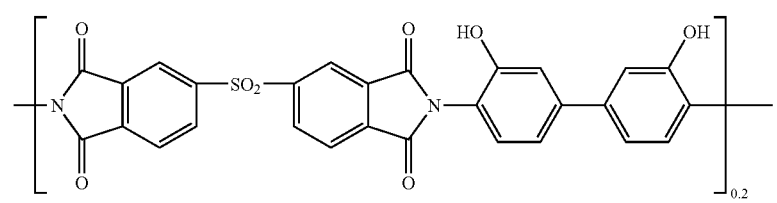
(24-1)

-continued

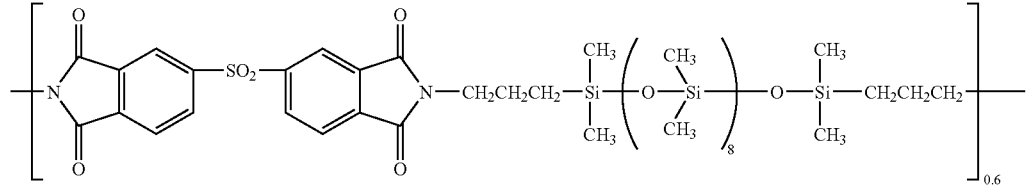

(24-2)

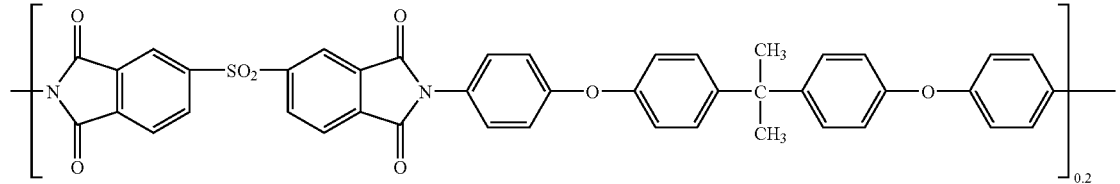

(24-3)

A weight average molecular weight of the resin, reduced to polystyrene, was 39,000, which was determined by gel permeation chromatography (GPC) using tetrahydrofuran as a solvent. Table 1 shows an OH group equivalent weight and a vinyl group equivalent weight of the polyimide silicone resin (d) determined by $^1$H-NMR.

Synthesis 5

Synthesis of a Comparative Polyimide Silicone Resin

In a flask provided with a stirrer, a thermometer, and nitrogen purge equipment, 35.8 g (0.1 mole) of 3,3',4,4'-diphenylsulfone tetracarboxylic acid anhydride and 400 g of N-methyl-2-pyrrolidone were placed. In the flask, a solution of 38.0 g (0.01 mole) of diaminosiloxane represented by the following formula (25) which does not have a radically polymerizable group, 4.3 g (0.02 mole) of 4,4'-(3,3'-dihydroxyl)diaminobiphenyl and 28.7 g (0.07 mole) of 2,2-bis[4-(4-aminophenoxy)phenyl]propane dissolved in 200 g of N-methyl-2-pyrrolidone was added dropwise while keeping a temperature of the reaction mixture at 50° C. or lower.

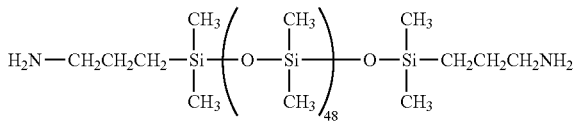

(25)

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (26-1), (26-2) and (26-3), hereinafter referred to as the polyimide silicone resin (e) was obtained.

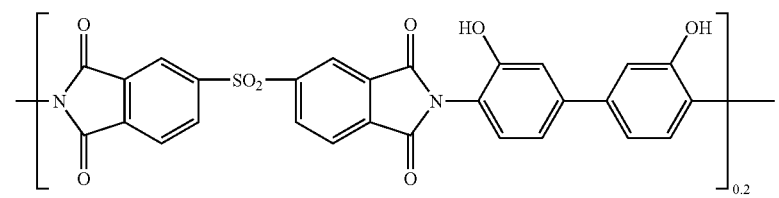

(26-1)

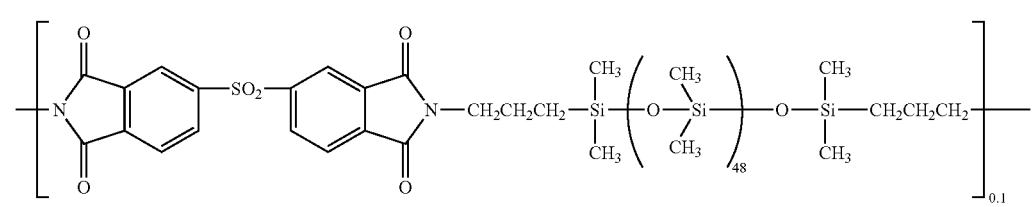

(26-2)

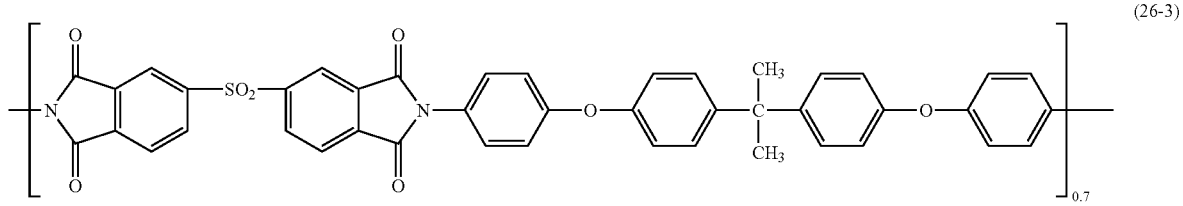
(26-3)

A weight average molecular weight of the resin, reduced to polystyrene, was 41,000, which was determined by gel permeation chromatography (GPC) using tetrahydrofuran as a solvent. Table 1 shows an OH equivalent weight of the polyimide silicone resin (e) determined by $^1$H-NMR.

Synthesis 6

Synthesis of a Comparative Polyimide Silicone Resin

In a flask provided with a stirrer, a thermometer, and nitrogen purge equipment, 35.8 g (0.1 mole) of 3,3',4,4'-diphenylsulfone tetracarboxylic acid anhydride and 400 g of N-methyl-2-pyrrolidone were placed. In the flask, a solution of 89.0 g (0.095 mole) of diaminosiloxane represented by the following formula (27) and 2.1 g (0.005 mole) of 2,2-bis[4-(4-aminophenoxy)phenyl]propane dissolved in 100 g of N-methyl-2-pyrrolidone was added dropwise while keeping a temperature of the reaction mixture at 50° C. or lower.

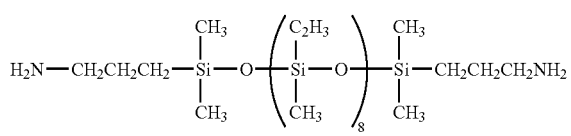
(27)

After the addition was completed, the reaction mixture was stirred at room temperature for another 10 hours. Subsequently, a reflux condenser provided with a water receptor was attached to the flask and, then, 30 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (28-1), (28-2) and (28-3) which does not have a phenolic hydroxyl group, hereinafter referred to as the polyimide silicone resin (f), was obtained.

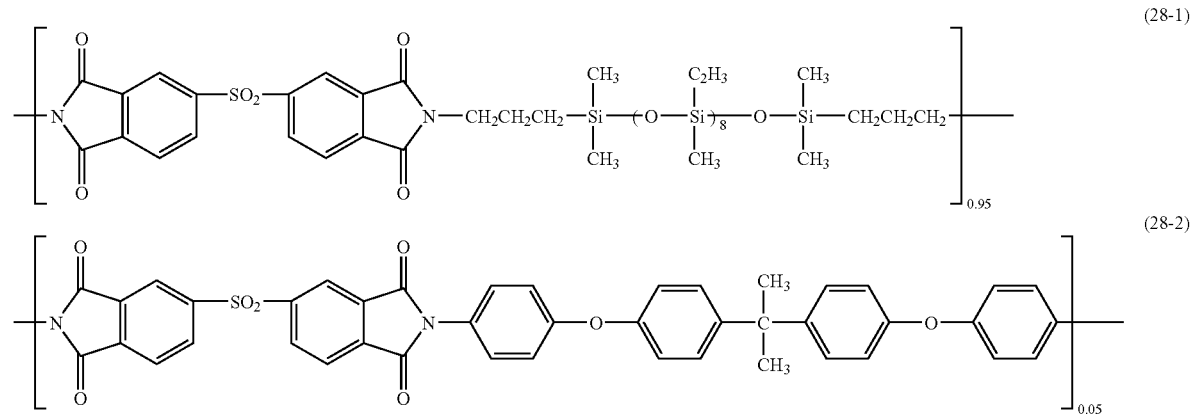

A weight average molecular weight of the resin, reduced to polystyrene, was 44,000, which was determined by gel permeation chromatography (GPC) using tetrahydrofuran as a solvent. Table 1 shows Vinyl equivalent weight of the polyimide silicone resin (f) determined by $^1$H-NMR.

Preparation of Resin Compositions

Resin compositions were prepared by mixing a polyimide resin, epoxy resin, organic peroxide, imidazole compound and a solvent according to the formulations shown in Table 2. In Table 2, "parts" means "parts by weight."

Preparation of a Cured Film and Evaluation of the Film (1) Solvent Resistance

A composition obtained was applied to a glass plate in about 100 μm thick. The applied composition was heated at a temperature of 80° C. for 30 minutes and then 180° C. for 1 hour, whereby a cured film of the composition was formed. The glass plate with the cured film thereon was soaked in N-methyl-2-pyrrolidone (NM2P) at a temperature of 80° C. After 1 hour, the glass plate was taken out from NM2P and the cured film was visually observed for any changes in appearance from its initial appearance. The results are as shown in Table 3.

(2) Adhesion Strength

A resin composition was applied to a copper substrate and an aluminum substrate, and then heated at 80° C. for 30 minutes and then 180° C. for 1 hour, whereby cured films of the composition was formed. Adhesion strength after keeping the copper and aluminum substrates with the cured film thereon in a saturated water vapor at 2.1 atm for 168 hours, hereinafter referred to as "humidity resistance of adhesion", and adhesion strength after keeping the copper and aluminum substrates with the cured film thereon in a dryer at 200° C. for 1000 hours, herein after referred to as "heat resistance of adhesion", were measured by a crosscut adhesion test according to the Japanese Industrial Standards (JIS) K5400. The results are as shown in Table 3, wherein a numerator indicates a number of patches per 100 patches which were not peeled off. For example, 100/100 indicates that no patch was peeled off and 0/100 indicates that all of the 100 patches were peeled off.

TABLE 1

| polyimide silicone resin | OH group equivalent weight, g/eq | Vinyl group equivalent weight, g/eq | (OH + Vinyl) groups quivalent weight, g/eq |
|---|---|---|---|
| a | 2540 | 420 | 360 |
| b | 1720 | 520 | 400 |
| c | 2740 | 460 | 390 |
| d | 2470 | — | 2470 |
| e | 2670 | — | 2670 |
| f | — | 120 | 120 |

TABLE 2

| | polyimide silicone resin | parts | Epoxy resin | parts | Organic peroxide | parts | Imidazole | parts | Solvent | parts |
|---|---|---|---|---|---|---|---|---|---|---|
| Example 1 | a | 100 | (g) | 15 | (h) | 1 | (i) | 0.2 | CH | 400 |
| Example 2 | a | 100 | (g) | 20 | (h) | 1 | — | — | CH | 400 |
| Example 3 | b | 100 | (g) | 15 | (h) | 1 | (i) | 0.2 | CH | 400 |
| Example 4 | c | 100 | (g) | 15 | (h) | 1 | (i) | 0.2 | CH | 400 |
| Referential Example 1 | a | 100 | — | — | (h) | 1 | — | — | CH | 400 |
| Referential Example 2 | a | 100 | (g) | 15 | — | — | (i) | 0.2 | CH | 400 |
| Referential Example 3 | f | 100 | — | — | (h) | 1 | — | — | CH | 400 |
| Comparative Example 1 | d | 100 | (g) | 15 | (h) | 1 | (i) | 0.2 | CH | 400 |
| Comparative Example 2 | e | 100 | (g) | 15 | (h) | 1 | (i) | 0.2 | CH | 400 |

(g): Diglycidylbisphenol-A
(h): 1,6-bis(4-t-butylperoxycarbonyloxy)hexane
(i): 2-methyl imidazole
CH: cyclohexanone

TABLE 3

| | Resistance to NM2P Appearance change | Humidity resistance of adhesion | | Heat resistance of adhesion | |
|---|---|---|---|---|---|
| | | Copper | Aluminum | Copper | Aluminum |
| Example 1 | None | 100/100 | 100/100 | 100/100 | 100/100 |
| Example 2 | None | 100/100 | 100/100 | 100/100 | 100/100 |
| Example 3 | None | 100/100 | 100/100 | 100/100 | 100/100 |
| Example 4 | None | 100/100 | 100/100 | 100/100 | 100/100 |
| Referential Example 1 | Dissolved | 100/100 | 100/100 | 100/100 | 100/100 |
| Referential Example 2 | Heavily swollen | 100/100 | 100/100 | 100/100 | 100/100 |
| Referential Example 3 | None | 100/100 | 100/100 | 0/100 | 0/100 |
| Comparative Example 1 | Heavily swollen | 100/100 | 100/100 | 100/100 | 100/100 |
| Comparative Example 2 | Heavily swollen | 0/100 | 0/100 | 0/100 | 0/100 |

The compositions of Comparative Examples 1 and 2 both lacked aliphatic unsaturated group and cured films therefrom were inferior in solvent resistance. The composition of Referential Example 1 lacked the epoxy resin, and the composition of Referential Example 2 lacked the organic peroxide. The cured films made from these compositions were also inferior in solvent resistance. The composition of Referential Example 3 lacked both phenolic OH group and the epoxy resin, so that adhesion strength of its cured film was drastically degraded by heating. In contrast, cured films of Examples 1 to 4 were well resistant to solvent, and adhesion strength thereof was resistant to heat and humidity.

INDUSTRIAL APPLICABILITY

The present polyimidesilicone resin composition is useful for protective films of electric parts and semiconductor materials, interlayer dielectric film and adhesive tapes. It is advantageously used for applying to a substrate which has relatively low heat resistance or relatively easily deforms by heat.

The invention claimed is:

1. A heat-curable resin composition, comprising
   (A) a polyimide silicone resin having a phenolic hydroxyl group and a radically polymerizable group bonded to a silicon atom,
   (B) an epoxy resin in such an amount that a molar ratio of the epoxy groups of the epoxy resin to the phenolic hydroxyl groups of the polyimide silicone resin (A) ranges from 0.2 to 10, and
   a catalytic amount of (C) an organic peroxide.

2. The heat-curable resin composition according to claim 1, wherein the polyimide silicone resin (A) comprises three types of the repeating units represented by the formulas (1-1), (1-2) and (1-3) and has a weight average molecular weight, reduced to polystyrene, of from 5,000 to 150,000

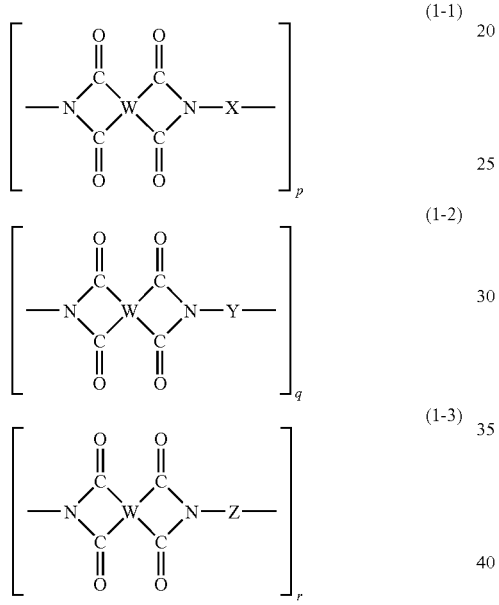

wherein W is a tetravalent group,
X is a divalent group having the phenolic hydroxyl group and is independently selected from the following groups represented by the formulas (2) to (6) shown below,

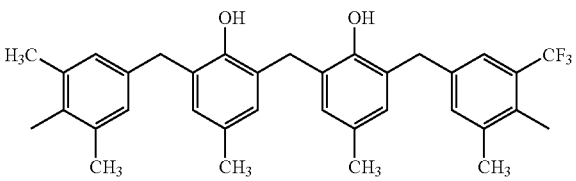

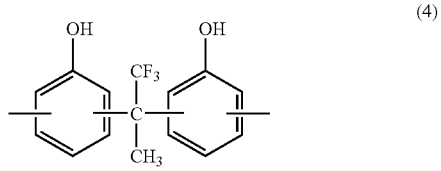

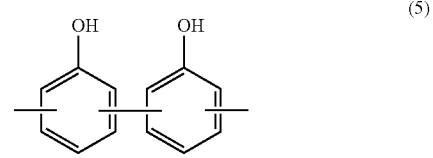

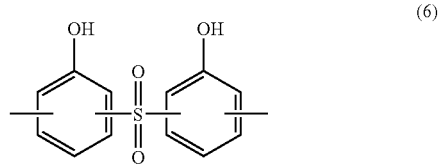

Y is a divalent silicone residue which has the radically polymerizable group bonded to a silicon atom and is represented by the following formula (7),

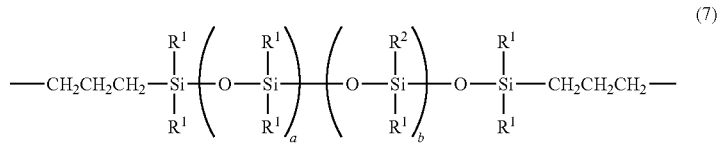

wherein $R^1$ may be the same with or different from each other and is a substituted or unsubstituted monovalent hydrocarbon group having 1 to 8 carbon atoms, $R^2$ is the radically polymerizable group, and each of a and b is an integer of from 0 to 100, Z is a divalent group other than X and Y, and p, q and r are positive numbers smaller than 1, with p+q+r being 1.

3. The heat-curable resin composition according to claim 1, wherein the radically polymerizable group is a vinyl group.

4. The heat-curable resin composition according to claim 2, wherein $0.15 \leq p+q \leq 1.0$ and $0.05 \leq q \leq 0.9$.

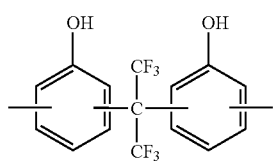

5. The heat-curable resin composition according to claim 1 to 3, wherein the polyimide silicone resin (A) has
a hydroxyl group equivalent weight of from 800 g/eq to 5,000 g/eq,
a vinyl group equivalent weight of from 200 g/eq to 1,000 g/eq, and
a theoretical equivalent weight of from 150 g/eq to 800 g/eq, said theoretical equivalent weight being calculated by dividing a molecular weight of the polyimide silicone resin by a total number of the OH groups and the vinyl groups.

6. The heat-curable resin composition according to claim 1, wherein the epoxy resin (B) is a bisphenol-A type epoxy resin.

7. The heat-curable resin composition according to claim 1, wherein the organic peroxide (c) is selected from the group consisting of monoperoxy carbonates and peroxy dicarbonates.

8. The heat-curable resin composition according to claim 1, wherein the organic peroxide is contained in an amount of from 0.1 to 5 parts by weight per 100 parts by weight of the polyimide silicone resin (A).

9. A film prepared by curing a heat-curable resin composition, comprising:
(A) a polyimide silicone resin having a phenolic hydroxyl group and a radically polymerizable group bonded to a silicon atom;
(B) an epoxy resin in such an amount that a molar ratio of the epoxy groups of the epoxy resin to the phenolic hydroxyl groups of the polyimide silicone resin (A) ranges from 0.2 to 10; and
a catalytic amount of (C) an organic peroxide.

* * * * *